United States Patent [19]

Cervola

[11] Patent Number: 5,259,409
[45] Date of Patent: * Nov. 9, 1993

[54] FERTILIZER MIXING CHAMBER

[76] Inventor: William F. Cervola, 6856 Espanita St., Long Beach, Calif. 90815

[*] Notice: The portion of the term of this patent subsequent to Aug. 26, 2008 has been disclaimed.

[21] Appl. No.: 841,058

[22] Filed: Feb. 25, 1992

[51] Int. Cl.$^5$ .................. B01D 11/02; A01C 23/00
[52] U.S. Cl. ................................ 137/268; 422/264
[58] Field of Search ....................... 137/268; 422/264

[56] References Cited

U.S. PATENT DOCUMENTS

| | | |
|---|---|---|
| 2,057,785 | 10/1936 | Milburn . |
| 2,627,278 | 6/1951 | Somers . |
| 2,885,271 | 5/1959 | Kersh ........................ 137/268 X |
| 3,095,005 | 6/1963 | Thompson .................. 137/268 |
| 3,134,546 | 5/1964 | Laughlin . |
| 3,990,855 | 11/1976 | Cort ............................ 137/268 X |
| 4,080,981 | 3/1978 | Stewart . |
| 4,385,034 | 5/1983 | Gacer ......................... 137/268 X |
| 4,729,399 | 3/1988 | Wetzel et al. . |
| 4,811,753 | 3/1989 | Bethune . |
| 4,881,568 | 11/1989 | Ho ............................... 137/268 |
| 4,907,618 | 3/1990 | Ho ............................... 137/268 |
| 4,995,418 | 2/1991 | Cervola ....................... 137/268 |

Primary Examiner—Martin P. Schwadron
Assistant Examiner—L. R. Leo
Attorney, Agent, or Firm—Richard C. Litman

[57] ABSTRACT

A chamber including a connector for mixing water and any of a variety of dehydrated plant chemicals such as fertilizer or insecticide. The mixing chamber is attached to an existing anti-siphon valve assembly by a connector. The connector attaches the chamber to the anti-siphon valve assembly and has a number of water entry and exit ports which pass through the connector and permit water to enter the chamber from the anti-siphon valve assembly. This permits water to effectively mix with the dry chemicals and then have the water-chemical solution forced from the chamber and applied to vegetation by a sprinkler system. The anti-siphon valve prohibits the water-chemical solution from contaminating the central water supply. The connector is an improvement over previous devices as the number of entry and exit ports have been increased, and also the configuration of the ports may be varied.

6 Claims, 1 Drawing Sheet

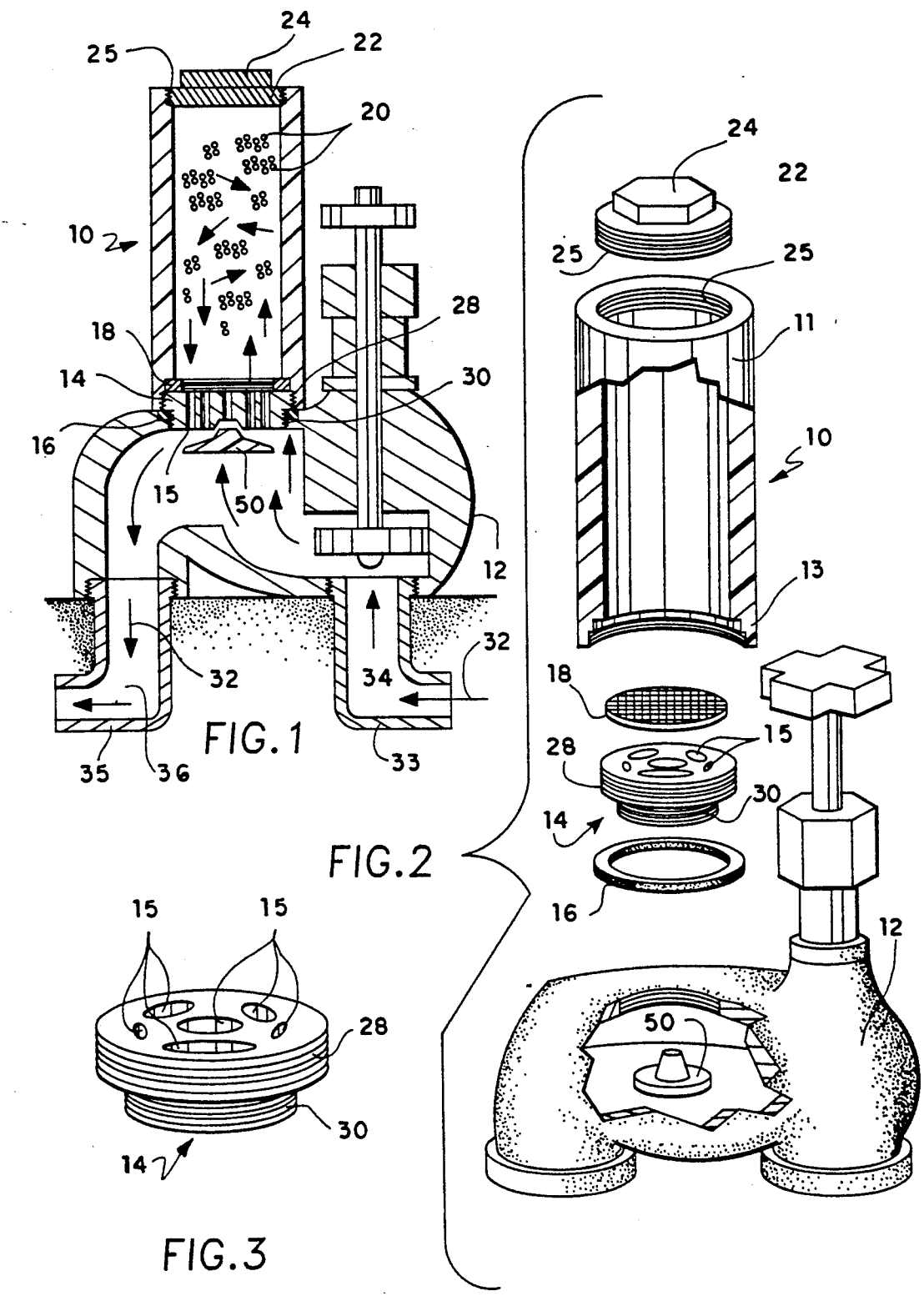

FERTILIZER MIXING CHAMBER

FIELD OF THE INVENTION

The present invention relates to a chamber which mixes dehydrated plant care chemicals with water for application to vegetation. More specifically this invention relates to a mixing chamber and attachment which may be connected to an existing anti-siphon valve assembly and sprinkler system. This invention is an improvement and extension of my application Ser. No. 07/423,226, filed Oct. 18, 1989, now U.S. Pat. No. 4,995,418, issued Feb. 26, 1991, which discloses a fertilizer sprinkler apparatus limited to only two ports on the connection means between an anti-siphon valve and a mixing chamber. It has been found that, with more passages through this connection, the fertilizer solution is more easily disbursed.

DESCRIPTION OF THE PRIOR ART

Devices which mix plant chemicals with water are known in art. U.S. Pat. No. 2,057,785 issued to Frank Milburn on Oct. 20, 1936 discloses an apparatus for mixing fertilizer with water. The device includes a screen, an entry and an exit port for the water, and a central mixing chamber.

U.S. Pat. No. 3,134,546 issued to Myron Laughlin on May 26, 1964 discloses an automatic chemical distributor. This invention comprises a chamber which is attached directly to a sprinkler for the disbursement of vegetation growth chemicals.

None of the above referenced devices, considered either singly or in combination, is seen to suggest the instant invention as claimed.

SUMMARY OF THE INVENTION

The present invention will attach to any existing watering system used for watering vegetation which has an anti-siphon valve assembly. It is anticipated that this invention would be used with watering system which may be present in a residential, a commercial, or a farm environment.

The present invention comprises a chamber with a connector for mixing water with a predetermined amount of any of a variety of plant chemicals such as fertilizer or insecticide. The mixing chamber is attached to an existing anti-siphon valve assembly by a connector. The connector attaches the chamber to the anti-siphon valve assembly and has a number of water entry and exit ports which pass through the connector and permit water to enter from the anti-siphon valve assembly. This permits water to effectively mix with the plant chemicals and then have the water-chemical solution forced from the chamber and applied to vegetation by a sprinkler system. The anti-siphon valve assembly prohibits the water-chemical solution from contaminating the central water supply.

The mixing chamber is used in the following manner. First, the mixing chamber may be attached to an existing watering system used for watering vegetation which has an anti-siphon valve assembly. The attachment of the mixing chamber is achieved by removing the cap of the anti-siphon valve assembly and replacing it with the mixing chamber. It should be noted that the anti-siphon device is left in the valve assembly to prevent contamination of the main watering system caused by any back flow of the water through the system. At this point a plant chemical is placed in the mixing chamber and then the mixing chamber is attached to the anti-siphon valve assembly. Water enters the mixing chamber from the anti-siphon valve assembly and forms a liquid solution with the plant chemical. This solution then travels through an existing system to a sprinkler head where the solution is sprayed on the vegetation.

The mixing chamber may be constructed of any material ranging from PVC, acrylic, nylon, brass, copper or any non-corrosive material that is capable of handling water and any chemical used on any vegetation. The chamber must be capable of withstanding water pressure used in sprinkler or irrigation systems.

The attachment device is an improvement over other such devices in that the number of ports have been increased. This permits more efficient mixing in the chamber and more efficient disbursement of the chemical solution.

The mixing chamber can be used with both dehydrated as well as liquid plant chemicals.

Accordingly, one object of the present invention is to provide a mixing chamber which may be attached to an existing anti-siphon valve assembly.

Another object of the present invention is to provide an attachment device which has more than two water entry and exit ports which allows for more complete mixing of the plant chemicals.

Another object of the present invention to provide chemically treated water through a watering system for vegetation wherein the time it takes for dispensing the chemical can be controlled by the number of inlet and outlet ports and by their size and shape.

Another object of the present invention is to provide entry and exit ports of different sizes and shapes to allow maximum mixing efficiencies for different plant chemicals.

These and other objects of the present invention will become readily apparent upon further review of the following specification and drawings.

BRIEF DESCRIPTION OF THE DRAWINGS

FIG. 1 shows a cross-sectional view of the mixing chamber affixed to an existing anti-siphon valve assembly;

FIG. 2 shows an exploded perspective view of the mixing chamber showing the location of all the internal components of the mixing chamber; and FIG. 3 shows a perspective view of the multi-port connector element.

Similar reference characters denote corresponding features consistently throughout the attached drawings.

DETAILED DESCRIPTION OF THE PREFERRED EMBODIMENTS

The present invention comprises a plant chemical mixing chamber 10 for use with an existing anti-siphon valve assembly 12 which allows any of a variety of dehydrated plant chemicals such as fertilizer or insecticide 20 to be added to water 34 which will be dispensed on a vegetation by a sprinkler system. Referring now specifically to FIGS. 1 and 2 the mixing chamber 10 is attached to an existing anti-siphon valve assembly 12 by a connector 14. The connector 14 attaches the chamber 10 to the anti-siphon valve assembly 12 and has a number of water entry and exit ports 15 which pass through the connector 14 and permit water 34 to enter from the anti-siphon valve assembly 12 from inlet pipe 33. Arrows 32 diagram the water flow pattern through the system. The water 34 effectively mixes with the dry chemicals 20 and then the water-chemical solution 36 is forced from the chamber 10 and is applied through outlet pipe 35 to vegetation by a sprinkler system. An anti-siphon valve 50 prohibits the water-chemical solution 36 from contaminating the incoming water supply during backup of the water-chemical solution by closing the inlet pipe 33 in a conventional and well-known fashion. Valve 50 cooperates with a conventional valve seat (not shown). The upwardly directed projection on valve 50 shown in FIGS. 1 and 2 cooperates with a shallow recess in the base of connector 14 as shown in FIG. 1 to prevent valve 50 from closing entry and exit ports 15. The mixing chamber 10 has an upper portion 11 and a bottom portion 13. The connector 14 has an upper threaded portion 28 and a lower threaded portion 30. The upper threaded portion 28 of the connector 14 is threaded into the bottom portion 13 of the mixing chamber 10. The lower threaded portion 30 of the connector 14 is threaded into the anti-siphon valve assembly 12. The upper threaded portion 28 must be rotated clockwise to thread whereas the lower threaded portion 30 must be rotated counter-clockwise to be threaded into the anti-siphon valve assembly 12. The way the upper threaded portion 28 and the lower threaded portion 30 must be threaded may be reversed from that described above. It is also conceived that an embodiment of the invention exists in which the upper threaded portion 28 and the bottom threaded portion 30 of the connector 14 may be rotated in the same direction to threadably connect the chamber 10 to the anti-siphon valve assembly 12.

Below the upper threaded portion 28 of connector 14 is a gasket 16 which keeps the solution 36 from leaking past the upper threaded portion 28. A screen 18 is located above and rests on the connector 14. This screen 18 is made of a non-corrosive material such as plastic or a non-ferrous metal. The screen 18 prevents any of the chemical 20 which is not dissolved in the solution 36 from passing out of the mixing chamber 10.

A cap 22 is threaded at 25 to the upper portion 11 of the chamber 10. This cap 22 is removable to permit plant chemicals 20 to be added when the chamber 10 is connected to the anti-siphon valve assembly 12. A hexagonal element 24 is located atop the cap 22 which would allow the cap 22 to be removed and tightened by a tool such as an adjustable wrench.

A plant chemical 20 is placed in the mixing chamber 10 and then the mixing chamber 10 is attached to the anti-siphon valve assembly 12. Water 34 enters the mixing chamber 10 from the anti-siphon valve assembly 12 and forms a liquid solution 36 with the plant chemical 20. This solution 36 then travels through an existing system to a sprinkler head where the solution 36 is sprayed on the vegetation.

The connector element 14 is an improvement over other such devices in that the number of ports 15 have been increased. This permits more efficient mixing in the chamber 10 and more efficient disbursement of the chemical solution 36.

With further reference to FIGS. 1 and 2, it is contemplated that chamber 10, cap 22 with element 24 and connector 14 may be made by a known injection mold process in one of two ways. In one embodiment, cap 22 with element 24 and chamber 10 may be molded as a one piece unit with screen 18 being placed upon connector 14, connector 14 being threaded into chamber 10, with the resultant chamber, screen, and connector assembly being threaded into the anti-siphon valve assembly 12 as previously described. Alternatively, connector 14 and chamber 10 may be molded as a one piece unit. In this case a screen 18 is simply dropped into chamber 10 to rest on connector 14, cap 22 with element 24 is then threaded into the top of chamber 10, and the completed chamber, screen and connector assembly is then threaded into the anti-siphon valve assembly 12 as previously set forth.

Also it is readily appreciated that cap 22 could have an exterior flange, internally threaded and fitted over the top of chamber 10, which would be matingly, externally threaded to receive cap 22 (not shown).

It is to be understood that the present invention is not limited to the embodiments described above, but encompasses any and all embodiments within the scope of the following claims.

I claim:

1. A plant chemical mixing device to be connected to a conventional inlet and outlet pipe assembly forming a water conduit of a sprinkler system, said device comprising:

a mixing chamber having an inner surface and an outer surface, said inner surface being substantially cylindrical, said inner surface having a lower open end, said inner surface meeting with said outer surface at said lower open end, said inner surface having a threaded surface at said lower open end;

a cylindrical chamber connector having a threaded edge, said threaded edge being removably engageable with said threaded surface at said lower open end of said mixing chamber;

said cylindrical chamber connector defining a plurality of entry ports and a plurality of exit ports passing therethrough:

said cylindrical chamber connector further having a threaded cylindrical element protruding therefrom;

said water conduit having a threaded opening for threadably engaging said protruding threaded cylindrical element of said cylindrical chamber connector;

said threaded surface at said lower open end of said mixing chamber and said threaded edge of said cylindrical chamber connector opposing the orientation of threads forming said protruding threaded cylindrical element of said cylindrical chamber connector; and a noncorrosive screen juxtaposed between said cylindrical chamber connector and said mixing chamber for preventing undissolved chemicals within said mixing chamber from exiting through said plurality of exit ports.

2. A plant chemical mixing device as in claim 1, wherein:

said inner surface further includes an upper open end and an upper threaded surface at said upper open end;

and a removably cap having a threaded outer edge is provided to threadably engage said upper threaded surface at said upper open end; whereby chemicals may be introduced into said mixing chamber without removing said mixing chamber from said water conduit.

3. A plant chemical mixing device as in claim 1, further comprising:

a gasket located intermediate said chamber connector and said water conduit.

4. A plant chemical mixing device as in claim 1, wherein said plurality of entry ports and said plurality of exit ports are generally circular.

5. A plant chemical mixing device as in claim 1, wherein said plurality of entry ports and said plurality of exit ports are generally elliptical.

6. A plant chemical mixing device as in claim 1, wherein said plurality of entry ports and said plurality of exit ports are of different sizes and shapes to enable maximum mixing efficiencies for different plant chemicals.

* * * * *